E. S. CLARK.
RAIL JOINT AND METHOD OF MAKING SAME.
APPLICATION FILED JULY 27, 1917.
1,265,051.
Patented May 7, 1918.
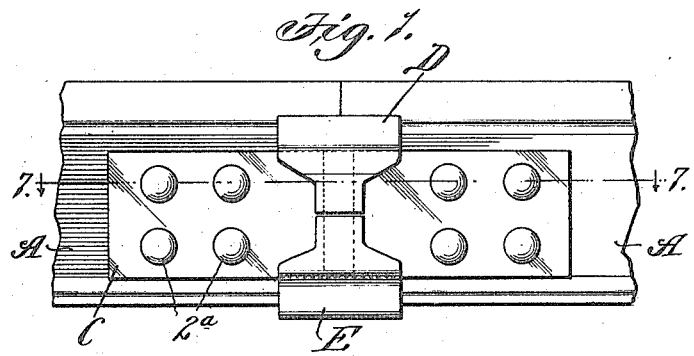
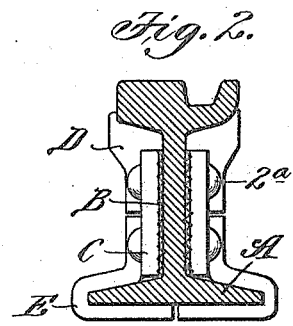
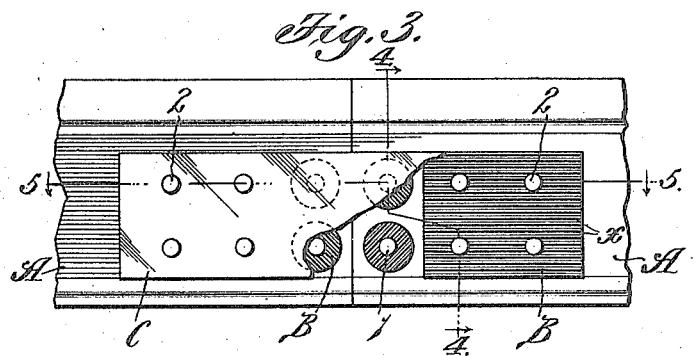
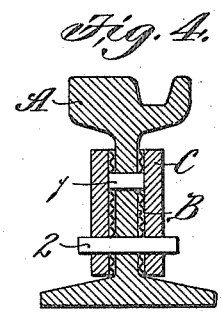
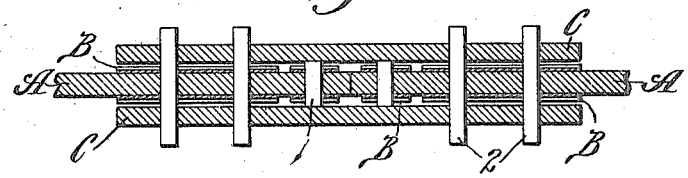
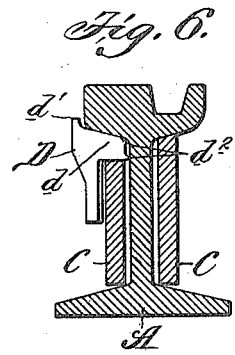
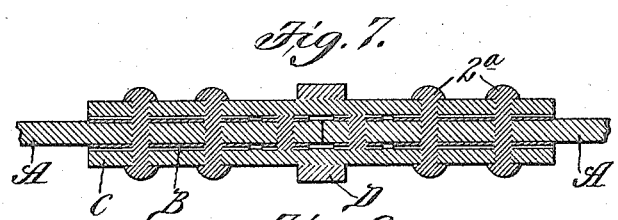
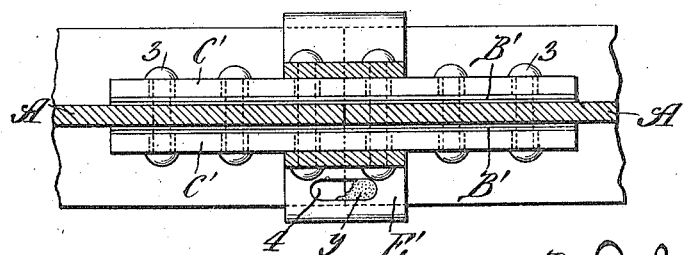
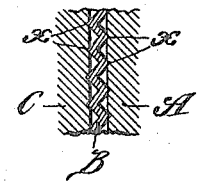
Inventor,
E. S. Clark.
By Bakewell & Cornwell Attys.

UNITED STATES PATENT OFFICE.

EDWARD S. CLARK, OF ST. LOUIS, MISSOURI.

RAIL-JOINT AND METHOD OF MAKING SAME.

1,265,051.　　　　　Specification of Letters Patent.　　Patented May 7, 1918.

Application filed July 27, 1917. Serial No. 183,071.

*To all whom it may concern:*

Be it known that I, EDWARD S. CLARK, a citizen of the United States, residing at St. Louis, Missouri, have invented a certain new and useful Improvement in Rail-Joints and Methods of Making Same, of which the following is a full, clear, and exact description, such as will enable others skilled in the art to which it appertains to make and use the same.

This invention relates primarily to rail joints of the type in which the rails are joined together by two bars or fish plates arranged on opposite sides of the webs of the abutting rails and electrically welded to the webs of the rails at the center and at the ends of the joint.

In producing a rail joint of the type referred to an electric current of high amperage and low voltage, usually thirty thousand amperes and five volts, is passed through the fish plates and through the webs of the rails at the center of the joint, so as to produce a welding heat, and the fish plates are then forced inwardly into engagement with the webs of the rails under great pressure, usually about four thousand pounds per square inch, so as to weld the fish plates directly to the webs of the rails. The portions of the rails and fish plates in proximity to said weld are then cooled, and thereafter, the operations above described are repeated at the ends of the joint, thus producing an electrically welded joint in which the fish plates are welded directly to the webs of the rails at three points, namely, at the center of the joint and at the opposite ends of the joint. One objectionable feature of a rail joint of the kind referred to is that the rails frequently break when atmospheric changes cause the rails to shrink or contract, due to the fact that the exceedingly high temperature to which the webs, heads and base flanges of the rails are subjected during the welding operations causes a change in the molecular arrangement of the steel, the breaks usually occurring in proximity to the end welds of the joint. Another serious objection to a rail joint of the kind referred to is its high cost of production, due to the amount of electricity used in the welding operations, the time required to bring the fish plates and the webs of the rails up to a welding heat and the time required to cool the rails and the fish plates between the welding operations. Still another objection to such a rail joint is that it requires special drop forged bars of variable lengths.

One object of my invention is to provide a method by which an electrically welded rail joint can be produced without liability of changing the molecular arrangement of the steel in the rails or in the bars or fish plates that embrace the webs of the rails.

Another object is to provide a method of producing an electrically welded rail joint that consumes less electric current and which requires less time to produce the joint than the method now generally used for producing electrically welded rail joints.

Another object is to provide a method for the purpose described which overcomes the necessity of cooling the rails between the welding operations.

And still another object is to provide an inexpensive and efficient continuous rail joint whose conductivity is substantially the same as a continuous rail. Other objects and desirable features of my invention will be hereinafter pointed out.

To this end I have devised a method for connecting rails together, which, briefly described, consists in arranging fillets or metal rods in holes in the webs of the rails, arranging bars or fish plates on opposite sides of the webs of the rails and then heating the fillets by an electric current and subjecting the fish plates and fillets to pressure in such a manner that the fillets will be welded to the fish plates and also to the edge portions of the holes in the webs of the rails through which the fillets pass. The fillets can either consist of short metal rods whose ends butt against the inner sides of the fish plates to which they are welded, or the fillets can consist of rods that pass through alined holes in the webs of the rails and in the fish plates. When long fillets of the character just referred to are used the end portions of the fillets are upset or flanged during the welding and compressing operations, so as to form heads on the fillets which are welded to the outer sides of the fish plates, the intermediate portions of the fillets being welded to the surrounding edges of the holes in the fish plates and in the webs of the rails.

One advantage of such a method is that the webs of the rails are not subjected to a temperature high enough to cause a molecular rearrangement of the steel, owing to the fact that the electric current is passed directly through the fillets and not through the webs of the rails, as in the method now generally used for producing electrically welded rail joints. Furthermore, such a method eliminates the possibility of the heat spreading from the webs of the rails into the heads and base flanges of the rails, and thus changing the character or formation of the steel in these portions of the rails. In fact, my method insures the rails being in substantially the same condition at the completion of the joint as they were prior to the welding operation, and consequently, there is no greater tendency for the rails of my improved joint to break than in a joint of the type in which the fish plates are held in engagement with the rails by bolts. Another advantage of my method is that it overcomes the necessity of cooling the rails between the welding operations. And still another advantage of said method is that the fillets can be brought up to a welding heat quickly with a comparatively small amount of electric current, the time usually required by my method to bring the fillets of each weld up to welding temperature being less than a half minute, whereas, in the process now in general use from one and one-half to three minutes is required at each weld to heat the fish plates and the webs of the rails to a welding temperature.

Figure 1 of the drawings is a side elevational view of an electrically welded rail joint constructed in accordance with my invention.

Fig. 2 is an end elevational view of said joint.

Fig. 3 is a side elevational view, partly broken away, showing the parts of the joint assembled prior to the welding and compressing operations.

Fig. 4 is a vertical sectional view, taken on the line 4—4 of Fig. 3.

Fig. 5 is a horizontal sectional view, taken on the line 5—5 of Fig. 3.

Fig. 6 is a vertical sectional view, illustrating one of the head braces applied to the joint preparatory to the welding operation.

Fig. 7 is a horizontal sectional view, taken on the line 7—7 of Fig. 1, showing how the fillets are merged into the webs of the rails and into the fish plates by the welding and compressing operations.

Fig. 8 is a horizontal sectional view of a rail joint embodying some of the features of my invention but provided with fish plates or splice bars that are connected together by rivets which pass through the webs of the rails; and Fig. 9 is a detail sectional view, illustrating how the corrugated plates, which I sometimes prefer to use, are embedded in the fish plates and in the webs of the rails during the compressing operation.

In my method it is essential that the webs of the rails be provided with holes through which fillets or metal rods can be arranged transversely of the rail. It is immaterial, however, so far as my broad idea is concerned, whether the ends of the fillets butt against the inner sides of the fish plates or pass through holes in the fish plates, the term "fish plate," as herein used, meaning members in the form of bars or plates that are arranged at opposite sides of the webs of the rails, so as to lap over the joint or space between the abutting ends of the rails. In actual practice I prefer to use short fillets at the center of the joint and long fillets at the ends of the joint. Therefore, I have herein illustrated my improved method used in the manner above referred to, but I wish it to be understood that it is immaterial whether short fillets be used at the center and also at the ends of the joint or whether long fillets be used at the center and at the ends of the joint. In some instances I arrange reinforcing plates between the fish plates and the webs of the rails so as to reinforce and strengthen the rails and form a more perfect union between the rails and the fish plates, and in some instances I also use head supports and base supports for reinforcing and strengthening the heads and base flanges of the rail. It is not necessary, however, that the joint be provided with reinforcing plates and head supports and base supports of the character above referred to, for in its simplest form my improved joint merely consists of two fish plates or bars arranged at opposite sides of the webs of the rails and joined together and also to the webs of the rails by fillets or metal rods that are electrically welded to the fish plates and to the surrounding portions of holes in the webs of the rails through which said fillets pass. In using my improved method to produce a rail joint equipped with reinforcing plates and also supporting elements for the heads and base flanges of the rails, as shown in the drawings, I arrange short fillets 1 in holes in the webs of two abutting rails A at the center of the joint and long fillets 2 in holes in the webs of said rails at the ends of the joint, as shown in Figs. 3 and 5. Thereafter, I arrange reinforcing plates or elements B on the opposite sides of the webs of the rails, as shown in Fig. 3, said reinforcing elements B having holes through which both sets of fillets pass and preferably consisting of corrugated plates or members harder than the rails and fish plates and provided with teeth or projections $x$ that sink into the webs of the rails and into the fish plates during the compressing operation, as hereinafter described. Fish plates or bars C are then arranged longitudinally of the rails, so as to embrace the reinforcing elements B, the fillets 1 at the center of the joint being so proportioned that the ends of same will butt against the inner sides of the fish plates C, and the fillets 2 at the ends of the joint being long enough so that they will project outwardly through holes in the fish plates C, as shown in Figs. 3 and 5. After the parts above referred to have been assembled an electric current is passed through each of the center fillets 1 so as to heat the same by means of an electric welding machine having terminals that are arranged in engagement with the outside faces of the fish plates at points directly opposite or in longitudinal alinement with the fillets 1. After the center fillets 1 have been brought up to a welding heat the electric current is cut off and great pressure is applied to the fish plates, so as to force them inwardly toward the webs of the rails, the heat and pressure to which the fillets 1 are subjected causing said fillets to become welded to the fish plates and to the portions of the webs of the rails and the reinforcing elements that surround the holes in said parts through which the fillets 1 pass. The terminals of the welding machine are then arranged in engagement with the fillets 2 at the ends of the joint, and after said end fillets 2 have been brought up to a welding heat, pressure is applied to same and to the fish plates, so as to cause the fillets 2 to become welded to the surrounding portions of the holes in the webs of the rails, in the reinforcing elements and in the fish plates through which the fillets 2 pass, the machine being so designed that heads $2^a$ will be formed on opposite ends of the fillets 2 during the welding and compressing operations, which heads will become welded to the outer sides of the fish plates. Three separate and distinct operations are required to produce the weld at the center of the joint and at the ends of the joint, but the time required for each weld is less than one-half of a minute, owing to the fact that a fillet or small metal rod can be brought up to a welding heat in a fraction of the time required to heat the web of a rail and fish plates that embrace same to a welding temperature. If the joint is to be provided with head supports for the rails, members D are arranged at opposite sides of the fish plate in engagement with the heads of the rails, as shown in Figs. 2 and 6, said members D having portions $d$ that project under the heads of the rails and portions $d'$ that bear against the sides of the heads of the rails. I also prefer to provide the members D with small fillets or ribs $d^2$, as shown in Fig. 6, that bear against the webs of the rails when said members D are arranged in operative position. After the members D have been properly positioned they are heated by an electric current and subjected to a sufficient pressure to cause them to become welded to the fish plates and to the heads and webs of the rails. If the joint is to be provided with base supports for the base flanges of the rails, supporting members E of the form shown in Figs. 1 and 2 are arranged in engagement with the base flanges of the rails and with the fish plates C at the center of the joint, said base supporting members E being either shrunk onto the base flanges of the rails, or welded to the rails and to the fish plates by an electric current or other means.

The fish plates C can either be so proportioned that the upper edges of the same terminate some distance from the undersides of the heads of the rails, as shown in Figs. 1 to 4, or the fish plate on the guard side of the joint can extend clear up under the guard flanges on the rails, as shown in Fig. 6. Moreover, the reinforcing elements B can either consist of comparatively short plates and washers provided with ribs, corrugations or teeth, as shown in Fig. 3, or two long reinforcing plates B' of substantially the same length as the fish plates can be employed, as shown in Fig. 8.

While I prefer to produce my improved joint by electrically welding fillets to the webs of the rails and to the fish plates or bars that embrace the webs of the rails, as illustrated in Figs. 1 to 7, inclusive, it is possible to produce a rail joint embodying some of the desirable characteristics of my invention by arranging toothed or ribbed reinforcing plates B' between the webs of the rails and the fish plates C', as shown in Fig. 8, and then connecting said elements together and to the webs of the rails by rivets 3 that are upset or headed after the fish plates C' have been subjected to great pressure, so as to cause the teeth or projections $x$ on the reinforcing plates B' to bite into the fish plates and the webs of the rails, as shown in Figs. 8 and 9. When the rail joint is produced in this manner it is preferable to arrange a chair E' on the base flanges of the rail which is shrunk onto said flanges or secured thereto in any other suitable manner, and thereafter electrically bonded to the rail by molten metal $y$ that is arranged in a hole 4 in said chair, as shown in Fig. 8.

My improved method produces an electrically welded rail joint that is superior to the electrically welded rail joint heretofore in use, in that it eliminates the liability of the molecular arrangement of the steel in the rails being changed during the welding operation; it overcomes the necessity of cooling the rails between the welding operations, owing to the fact that the rails are not heated to a temperature high enough to necessitate cooling the same during the operation of bringing the fillets up to a welding heat, and it materially reduces the cost of producing electrically welded rail joints and the time required to form the joint. Moreover, my improved joint makes the rails of a track substantially as strong at the points where they are joined together as at any other portions of the track, and in addition to the fact that it is a continuous joint, my improved joint has substantially the same conductivity as a rail, this being so whether the joint is produced by electrically welding fillets to the webs of the rails and to the fish plates, or by riveting the fish plates and the reinforcing elements to the webs of the rails, as in the form of my invention shown in Fig. 8. Furthermore, the fish plates or side bars of my improved joint can be made of standard length or lengths and they can consist of imperforate plates when short fillets are used or plates having holes punched or formed in the same in any other manner when long fillets are used. This characteristic of my joint adds materially to its commercial merit, as it reduces the cost of the joint considerably and overcomes the necessity of using fish plates or side bars of variable length provided with special forged bosses or projections, as was heretofore necessary, owing to the fact that in the prior joint the welds were produced by passing a current of electricity directly through the fish plates and through solid portions of the webs of the rails. In other words, in my joint the usual bolt holes in the webs of the rails are used to carry the fillets, and therefore, either plain or perforated bars can be used to form the fish plates or side members of the joint, whereas, in the joint heretofore in use it was necessary to use side plates or bars provided with forged projections arranged in such a manner that they would contact with solid portions of the webs of the rails.

Having thus described my invention, what I claim, and desire to secure by Letters Patent, is:

1. A method of producing an electrically welded rail joint, characterized by arranging fillets or metal rods transversely in the webs of two abutting rails, arranging fish plates or bars longitudinally of the rails at opposite sides of the webs and thereafter heating said fillets by an electric current so as to weld them to the webs of the rails and to said fish plates.

2. A method of producing an electrically welded rail joint, characterized by arranging fillets or metal rods transversely in the webs of two abutting rails, arranging fish plates or bars longitudinally of the rails at opposite sides of the webs, and thereafter raising said fillets to a welding temperature and subjecting the fillets and fish plates to pressure so as to weld the fillets to the webs of the rails and to the fish plates.

3. A method of producing an electrically welded rail joint, characterized by arranging fillets or metal rods in holes in the webs of two abutting rails, arranging fish plates at the opposite sides of the rails, and welding said fillets to the webs of the rails and to said fish plates by means of electric current and great pressure.

4. A method of producing an electrically welded rail joint, characterized by arranging fillets or metal rods in holes in the webs of two abutting rails, arranging fish plates at opposite sides of the webs of the rails in engagement with said fillets, and passing a current of electricity through said fillets so as to weld the fillets to the fish plates and to the surrounding portions of the holes and the webs of the rails through which the fillets pass.

5. A method of producing an electrically welded rail joint, characterized by arranging fillets or metal rods in holes in the webs of two abutting rails, arranging fish plates at opposite sides of the webs of the rails, passing a current of electricity through said fillets so as to raise them to a welding heat, and thereafter subjecting the fish plates and fillets to pressure so as to cause the fillets to become welded to the fish plates and to the portions of the webs of the rails through which said fillets pass.

6. A method of producing an electrically welded rail joint, characterized by arranging fillets in holes in the webs of two abutting rails, arranging fish plates at opposite sides of the rails in engagement with the ends of said fillets, and passing a current of electricity through said fish plates and through said fillets so as to weld the fillets to the fish plates and to the webs of the rails.

7. A method of producing an electrically welded rail joint, characterized by arranging fillets in alined holes in the webs of two abutting rails and in fish plates that embrace said webs, passing a current of electricity through said fillets so as to heat them to a welding temperature, and subjecting said fish plates and fillets to pressure so as to weld the fillets to the fish plates and to the webs of the rails.

8. A method of producing an electrically welded rail joint, characterized by arranging fillets in alined holes in the webs of two abutting rails and in fish plates that embrace said webs, passing a current of electricity through said fillets so as to heat them to a welding temperature, subjecting said fish plates and fillets to pressure so as to weld the fillets to the fish plates and to the webs of the rails, and simultaneously forming heads on said fillets which lap over said fish plates.

9. A method of producing an electrically welded rail joint, characterized by arranging short fillets and long fillets in holes in the webs of two abutting rails, arranging fish plates on opposite sides of said webs so that the short fillets butt against the inner sides of said fish plates and the long fillets project outwardly through holes in said fish plates, and thereafter welding the fillets to the fish plates and to the webs of the rails by means of heat produced by an electric current that is passed through the fillets and by pressure applied in a direction tending to force the fish plates toward the webs of the rails.

10. A method of producing a rail joint, characterized by arranging two reinforcing elements on opposite sides of the webs of two abutting rails, arranging fish plates on opposite sides of the rails so as to embrace said reinforcing elements, and permanently connecting said parts together by means of fillets that pass transversely through same and which are electrically welded to said parts.

11. A method of producing a rail joint, characterized by arranging fish plates on opposite sides of the webs of two abutting rails, permanently connecting said parts together by means of fillets that are electrically welded to the fish plates and to the webs of the rails, arranging head supports in engagement with the heads of the rails, and electrically welding said supports to said fish plates and rail heads.

12. A method of producing a rail joint, characterized by arranging fish plates on opposite sides of the webs of two abutting rails, permanently connecting said parts together by means of fillets that are electrically welded to the webs of the rails and to said fish plates, and arranging base supporting devices in engagement with the base flanges of the rails at the center of the joint and connecting said base supports to the flanges of the rails and to said fish plates.

13. A method of connecting two metal members together, characterized by arranging a fillet or metal rod in a hole in one of said members, arranging the other member in engagement with the fillet and with the member that receives the fillet, passing an electric current through the fillet so as to heat it to a welding temperature, and thereafter pressing said members together and subjecting the fillet to pressure so as to weld the fillet to both of said members.

14. A method of connecting two members together, characterized by arranging two metal members in parallel or superimposed relation, arranging a fillet or metal rod in alined holes in said metal members, passing a current of electricity through said fillet so as to heat it to a welding temperature, and thereafter subjecting said fillet to pressure so as to weld it to the edge portions of the holes through which it passes.

15. A rail joint, comprising bars or fish plates arranged on opposite sides of the webs of the rails, and fillets or metal rods arranged transversely of the webs of the rails and welded to said webs and to said fish plates.

16. A rail joint, comprising bars or fish plates arranged on opposite sides of the webs of the rails, and fillets or metal rods arranged transversely of the webs of the rails and welded to said webs and to said fish plates, some of said fillets having heads that lap over the outer sides of the fish plates.

17. A rail joint, comprising bars or fish plates arranged on opposite sides of the webs of the rails, and welds at the center and the ends of the joint produced by electrically welding fillets or metal rods, separate and distinct from the rails and from the fish plates, that were arranged transversely in holes in the webs of the rails prior to the welding operation.

18. A rail joint, comprising bars or fish plates arranged at opposite sides of the webs of the rails, two reinforcing elements interposed between the fish plates and the webs of the rails, and transversely-disposed connecting devices electrically welded to the webs of the rails, fish plates and said reinforcing elements.

19. A rail joint, comprising bars or fish plates arranged at opposite sides of the webs of the rails, toothed reinforcing elements interposed between the fish plates and the webs of the rails, and transversely-disposed connecting devices electrically welded to the webs of the rails, fish plates and said reinforcing elements, the connecting devices at the center of the joint being welded to the inner sides of the fish plates and the connecting devices at the ends of the joint being provided with heads that lap over the outer sides of the fish plates.

20. A rail joint, comprising bars or fish plates arranged at opposite sides of the webs of the rails, ribbed reinforcing elements interposed between the fish plates and the webs of the rails, transversely-disposed connecting devices electrically welded to the webs of the rails, fish plates and said reinforcing elements, the connecting devices at the center of the joint being welded to the inner sides of the fish plates and the connecting devices at the ends of the joint being provided with heads that lap over the outer sides of the fish plates, and means at the center of the joint for reinforcing and strengthening the heads and the base flanges of the rails.

21. A rail joint, comprising fish plates arranged at opposite sides of the webs of the rails, reinforcing elements interposed between the fish plates and the webs of the rails and provided with teeth or ribs that are sunk into said parts, head supports and base supports at the center of the joint that reinforce the heads and the base flanges of the rails, said supports being permanently connected to the rails and to said fish plates, and fillets extending transversely through the webs of the rails and electrically connected to same and to said fish plates.

EDWARD S. CLARK.

Copies of this patent may be obtained for five cents each, by addressing the "Commissioner of Patents, Washington, D. C."